I. C. DAKIN.
AUTOMATIC SAFETY DEVICE.
APPLICATION FILED AUG. 29, 1910.
992,858.
Patented May 23, 1911.
3 SHEETS—SHEET 2.
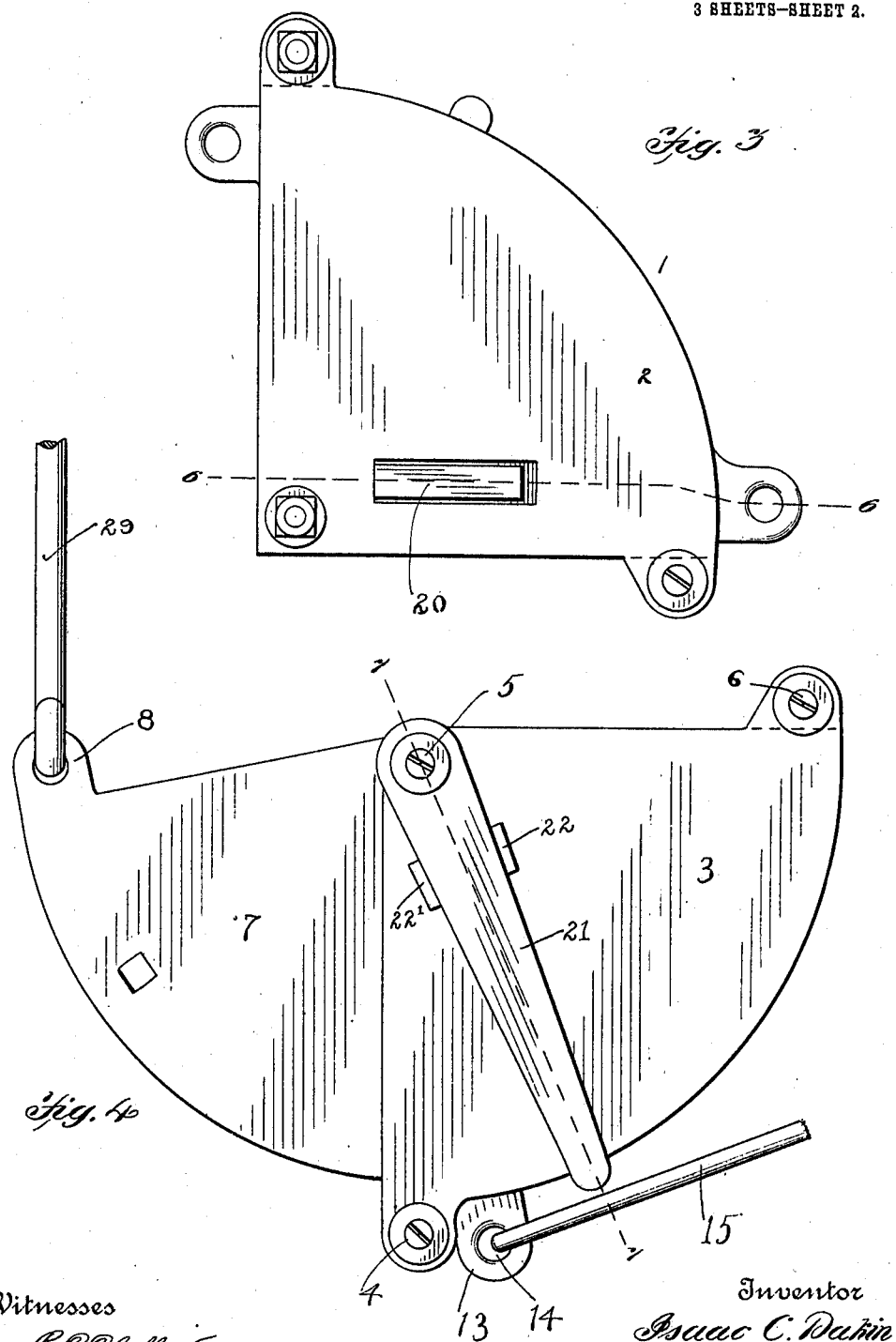

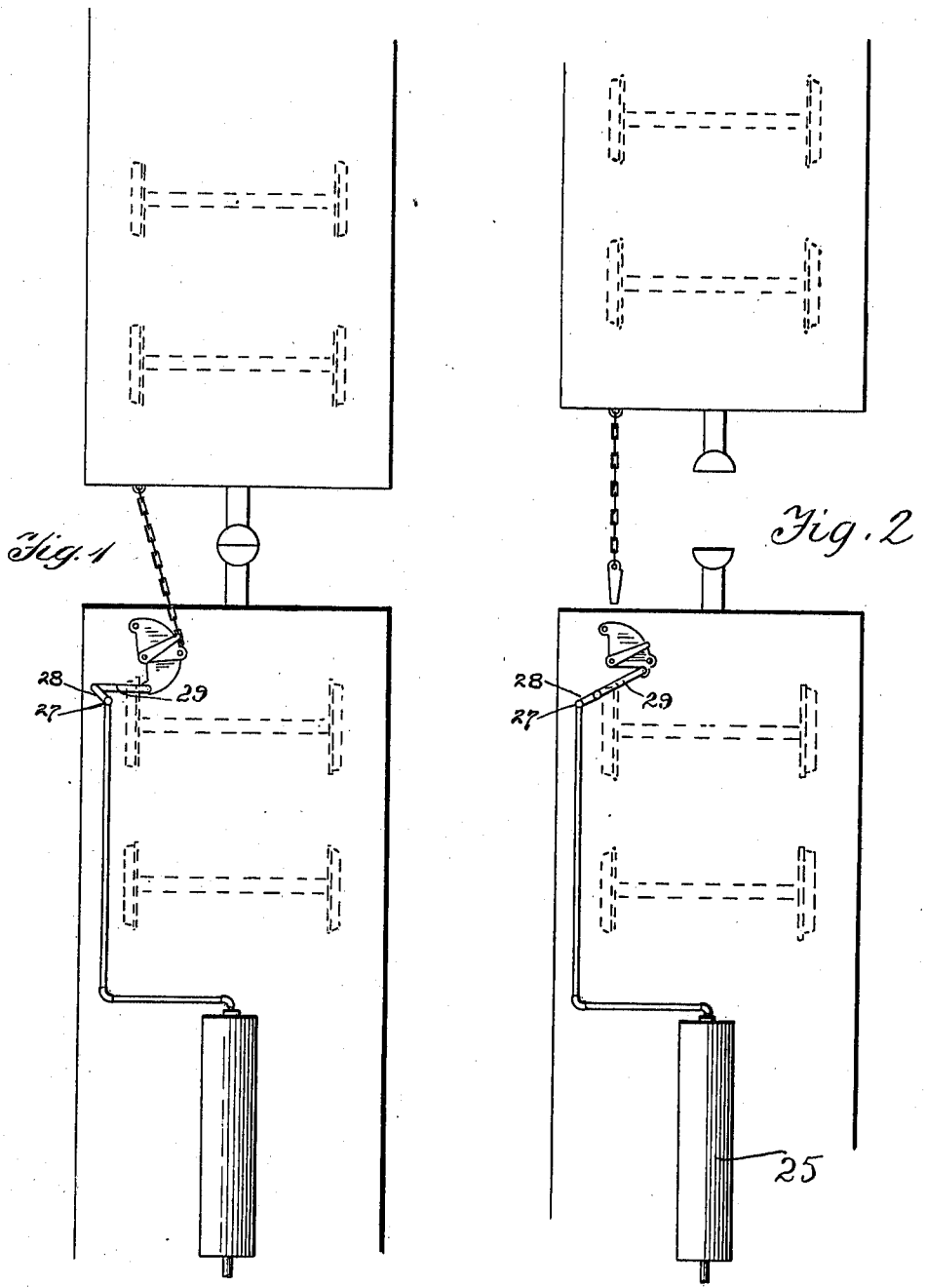

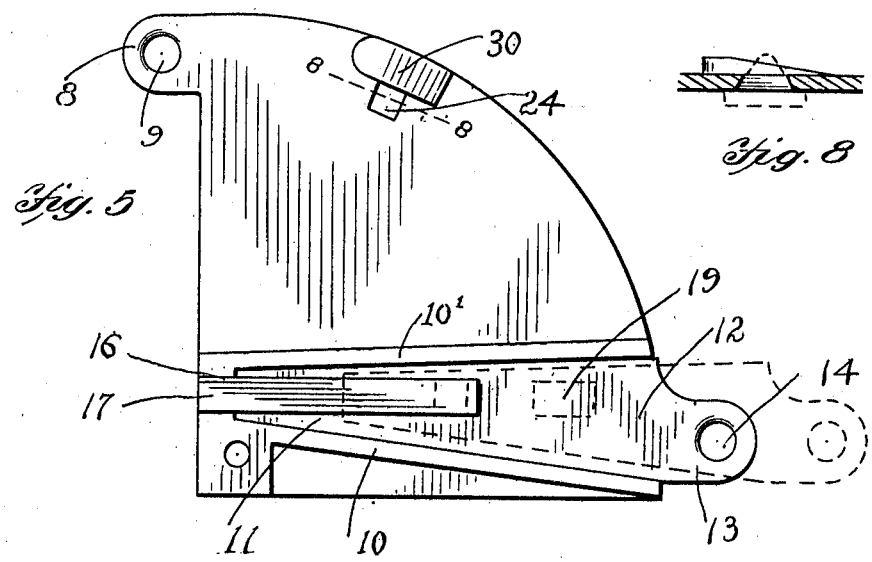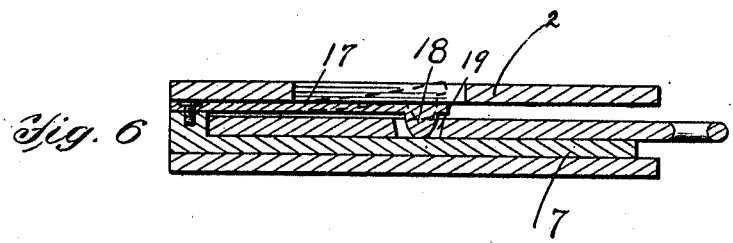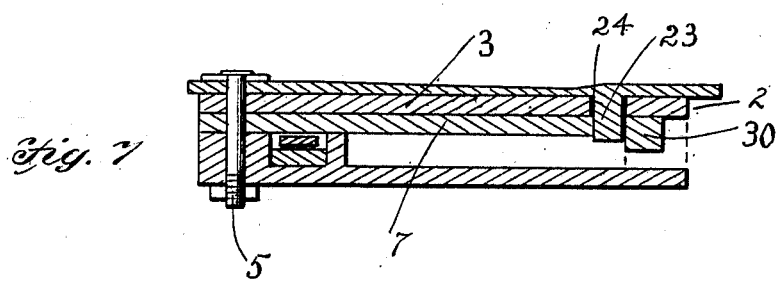

UNITED STATES PATENT OFFICE.

ISAAC C. DAKIN, OF WEST NEWTON, PENNSYLVANIA.

AUTOMATIC SAFETY DEVICE.

992,858.  Specification of Letters Patent.  Patented May 23, 1911.

Application filed August 29, 1910. Serial No. 579,383.

*To all whom it may concern:*

Be it known that I, ISAAC C. DAKIN, citizen of the United States, residing at West Newton, in the county of Westmoreland and State of Pennsylvania, have invented certain new and useful Improvements in Automatic Safety Devices, of which the following is a specification.

This invention relates to safety devices, and the principal object of the invention is to provide a means whereby a compressed air hose may be automatically closed, if accidentally opened through the separation of coupled cars.

It is a well known fact that many very serious accidents occur on railroads through the disabling of air brakes, often caused through the breaking of couplings or other accidental uncoupling thereof. My invention is adapted to close the cocks on the air pipes the instant the cars are separated.

In the accompanying drawings, Figure 1 is a bottom plan view of a portion of two coupled cars, showing safety devices attached thereto, Fig. 2 is a view similar to Fig. 1, the cars being uncoupled and the device in operation, Fig. 3 is a top plan view of a safety appliance, closed, Fig. 4 is a bottom plan view of Fig. 3, shown set for use, Fig. 5 is a detail of a pivoted member, Fig. 6 is a cross sectional view of Fig. 3 on the line 6—6, Fig. 7 is a cross sectional view of Fig. 4 on the line 7—7, and Fig. 8 is a detail of a key releasing member.

Like numerals of reference refer to like parts throughout the several views of the drawings and in the specification, in which, 1 indicates an automatic safety device consisting of the casing comprising the upper plate 2 and the lower plate 3, held together by means of the bolts 4, 5, and 6. Pivotally held between these two plates by means of the bolt 5 is a plate 7 having an ear 8 with an opening 9 therein. The upper surface of this plate is smooth but the lower surface thereof is provided with a pair of ribs 10 and 10', which are angularly disposed toward one another and are joined at one end by the integral lug 16, and form a key way 11 for a tapering key 12, which is slidable in said keyway, and its forward end 13 extends beyond the casing, and has an opening 14 therein to which is secured a chain or cord 15.

Secured by one end to the lug 16, is a spring locking member 17 having a downwardly extending lug 18 on its free end. This engages with the opening 19 in the key. This locking member normally holds the key in the keyway as the plate 2 abuts the member 17 holding it in locked engagement with the key, but when the plate 7 is in a closed position the lock member is directly under an opening 20 in the plate 2. As the plate 7 contacts with the lock member, the opening 20 is necessary in order to permit the withdrawal of the key. Under extraordinary strain the edge of the opening in the key presses against the lug 18 and forces the spring locking member far enough into the opening 20 to permit the lug 18 to be pushed out of the opening 19, thus freeing the key. Normally the plate 7 remains in the extended position as shown in Fig. 4, to hold it in this position a spring locking member 21 is provided and is held in place on the plate 3 by means of the bolt 5 and a pair of lugs 22 and 22'. A short distance from the free end of the member 21 is an integral latch 23 which is normally held in the opening 24 in the plate 3. The latch 23 extends below the plate 3 and engages the inner edge of the plate 7, holding it locked out normally, however, if an extraordinary strain is brought to bear on the chain 15 the inner edge of the plate 7 forces the latch 23 up and allows the plate to be drawn within the casing.

25 is a tank into which air is compressed for operating the brakes of a train and 26 are pipes for conveying the air from car to car, on this pipe is a cut off valve 27 which is operated by means of a lever 28, which is connected to one end of the chain 29, the other end of which is attached to the ear 8 of the plate 7.

Adjacent the opening 24 is an inclined lug 30 which when the plate 7 is within the casing holds it level and the latch 23 enters the opening 24 to hold the plate 7 against dislodgment when the key has been withdrawn from its socket or keyway.

The operation of this device is very simple, it is fastened on the bottom of a car near the end thereof as shown in Figs. 1 and 2, the free end of the chain 15 is secured to an opposite car, and the free end of the chain 29 is secured to the lever handle of a plug valve on the air pipe in such a manner that a drawing of the chain will close the valve and prevent air escapement. Should the cars become accidentally uncoupled, the chain 15 attached by one end to the disconnected car and the other end to the key will be drawn sufficiently taut to draw the plate 7 into the casing, bringing the key 12 and the spring locking member into such a position as to permit the member 17 to rise into the opening 20 and thereby release the key, however, before the release of the key from its socket the plate 7 has been drawn in thereby drawing the chain 29 and causing it to turn the valve cock, thus closing the air pipe 29 and preventing the escape of air should the hose coupling be broken.

I claim and desire to secure by Letters Patent:—

1. A safety cut-off consisting of a casing having upper and lower walls, a pivoted member in said casing having connection with a valve, means for operating said pivoted member, said means consisting of a detachable key, means for holding said key normally secured to said pivoted member, and means adapted to release said key under abnormal strain.

2. A safety cut-off consisting of a casing having upper and lower walls, a pivoted member in said casing having connection with a valve, means for operating said pivoted member, said means consisting of a detachable key, means for holding said key normally secured to said pivoted member, means adapted to release said key under abnormal strain, the means for holding said key to said pivoted member consisting of a spring controlled lock member.

3. A safety cut-off consisting of a casing having upper and lower walls, a pivoted member in said casing having connection with a valve, means for operating said pivoted member, said means consisting of a detachable key, means for holding said key normally secured to said pivoted member, means adapted to release said key under abnormal strain, the means for holding said key to said pivoted member consisting of a spring controlled lock member, said lock member being held in position by said upper wall.

4. A safety cut-off consisting of a casing having upper and lower walls, a pivoted member in said casing having connection with a valve, means for operating said pivoted member, said means consisting of a detachable key, means for holding said key normally secured to said pivoted member, means adapted to release said key under abnormal strain, the means for holding said key to said pivoted member consisting of a spring controlled lock member, said lock member being held in position by said upper wall, said upper wall having an opening therein to permit of the raising of said lock member.

In testimony whereof I affix my signature in presence of two witnesses.

ISAAC C. DAKIN.

Witnesses:
JOHN O. LANDSPARGER,
A. T. DARR.

Copies of this patent may be obtained for five cents each, by addressing the "Commissioner of Patents, Washington, D. C."